April 12, 1927.
A. E. BAUMAN
1,624,856
RESILIENT TIRE
Original Filed Sept. 5, 1922  2 Sheets-Sheet 1
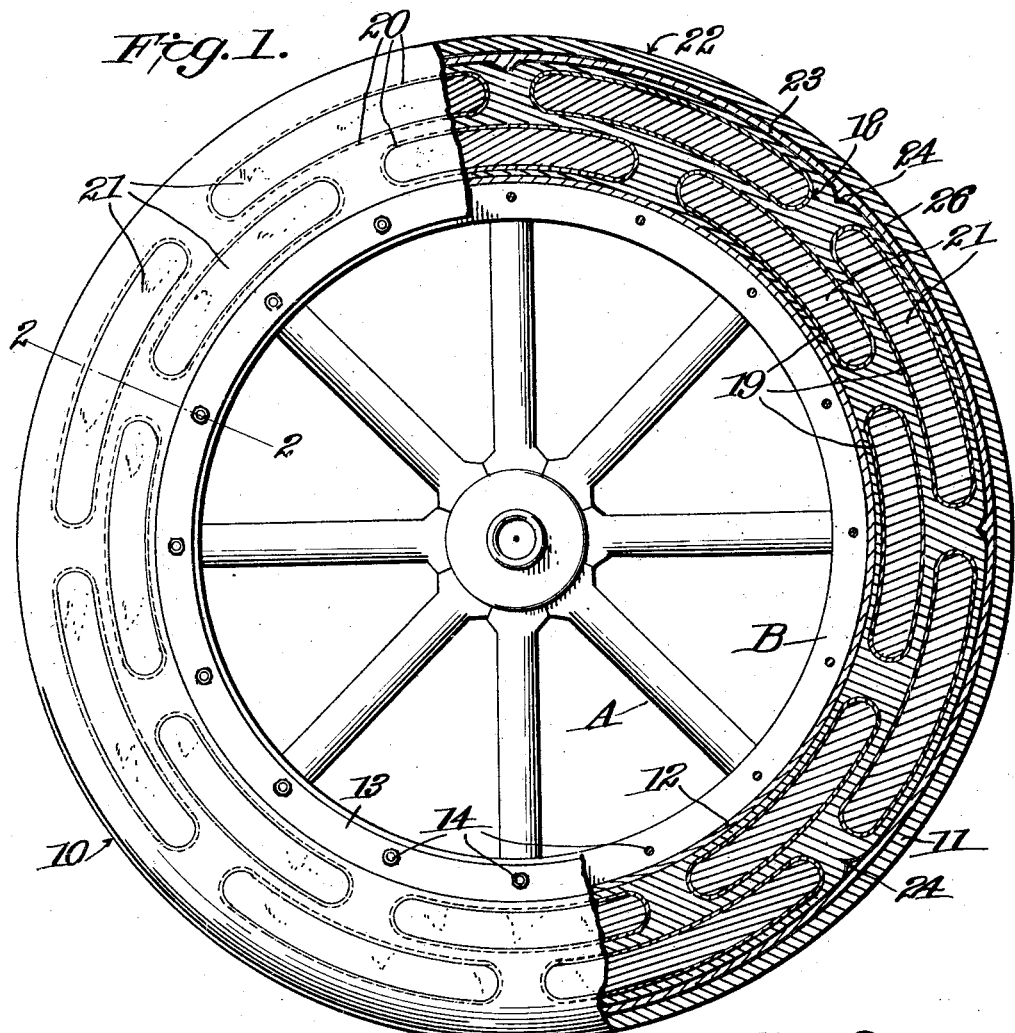
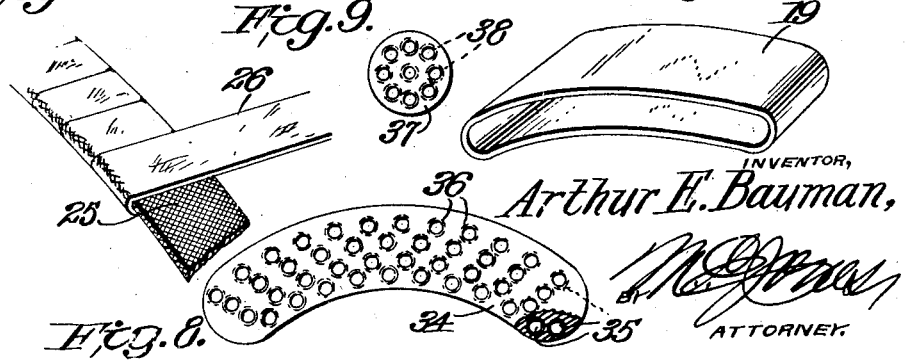

April 12, 1927. 1,624,856
A. E. BAUMAN
RESILIENT TIRE
Original Filed Sept. 5, 1922  2 Sheets-Sheet 2
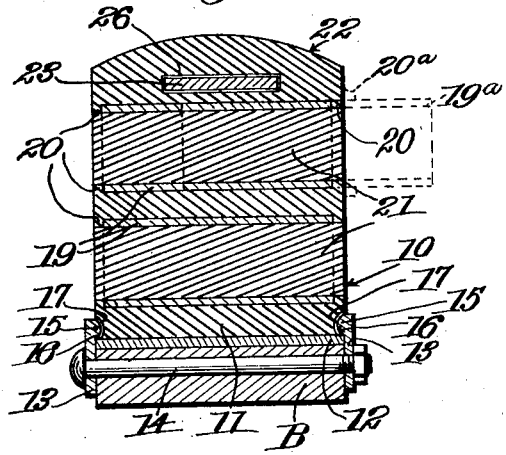
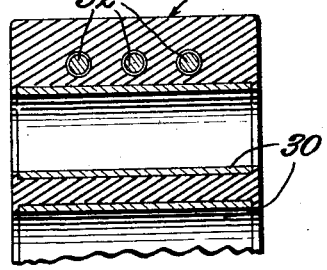
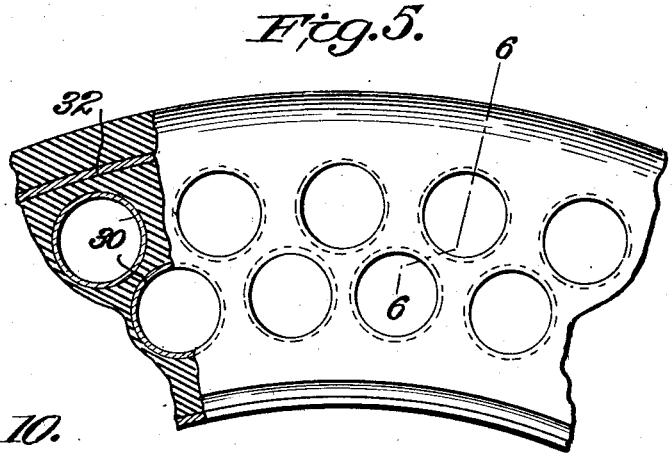
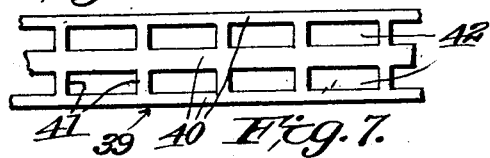
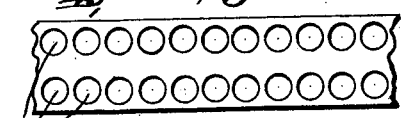
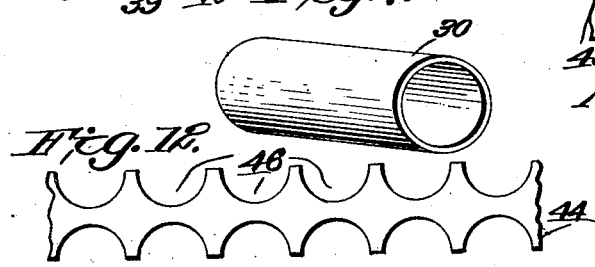
Arthur E. Bauman, INVENTOR,
BY
ATTORNEY.

Patented Apr. 12, 1927.

1,624,856

UNITED STATES PATENT OFFICE.

ARTHUR E. BAUMAN, OF AKRON, OHIO.

RESILIENT TIRE.

Application filed September 5, 1922, Serial No. 586,201. Renewed December 12, 1925.

This invention relates to a resilient tire.

The present invention constitutes an improvement of the structure set forth in Letters Patent No. 1,460,783, issued to me on July 3, 1923, for a resilient wheel.

One object is to provide a construction of resilient or cushion tire which is an adaptation of the resilient body described in said patent and to provide a structure generally improved over the aforesaid disclosure which attains maximum efficiency and employs simple and durable parts capable of expeditious and inexpensive manufacture.

A second object is to provide a novel construction of resilient body tire in which the cushioning springs when in action will be reinforced and the pressure thereof evened.

Another object is to provide a novel construction of flange means on the body or tire to retain the springs.

A further object is to provide a construction wherein the cushioning springs may be filled to prevent the accumulation of dirt therein without affecting their resiliency, in which the flange means referred to may serve as a fastening or means to which the filler may be secured.

With the above and additional objects which will appear hereinafter, in view, the invention has been embodied in one operative form as illustrated in accompanying drawings.

In said drawings:—

Figure 1 is a view illustrating partly in side elevation and partly in vertical section, a wheel having a tire thereon constructed in accordance with the invention.

Figure 2 is a cross sectional view on the line 2—2 of Figure 1.

Figure 3 is a detail perspective view of one of the cushioning springs employed.

Figure 4 is a detail perspective view illustrating the resilient reinforcing band.

Figure 5 is a fragmentary side elevation, partly in section, of a modified form of tire.

Figure 6 is a cross sectional view on the line 6—6 of Figure 5.

Figure 7 is a detail perspective view of one of the cushioning springs used in the modified form.

Figure 8 is a side elevation of a modified form of cushioning spring filler.

Figure 9 is a side elevation of another modified form of cushioning spring filler.

Figures 10, 11 and 12 are respectively, detail top or plan views of modified forms of reinforcing bands.

Referring first to the form of Figures 1 to 4, a wheel A is conventionally illustrated about the felly B of which a resilient body in the form of a tire 10 embodying the present improvement is detachably disposed.

Body or tire 10 is primarily made of resilient rubber as at 11 and at its inner or attaching edge is vulcanized or otherwise directly attached to a metallic rim or ring 12 which is directly slidable onto and off of felly B by lateral movement of the tire. As one form of fastening means to secure the tire to the wheel, metallic side plates or rings 13 may be disposed one at each side of felly B, overlapping said felly and ring 12 and being detachably secured as by bolts 14 to said felly. As shown in Figure 2, said plates 13 have annular inwardly extending projections 15 which may be cross-sectionally round, V or otherwise shaped and extend into grooves 16 formed in the sides of the tire or body and about which grooves 16 the tire may be lined with fabric or the like 17, if desired, to minimize chafing. The projections 15 may be similarly lined, if desired.

Provided laterally of the tire or body 10 and extending from side to side thereof, are openings or recesses 18 which are snugly occupied by metallic cushioning and reinforcing springs 19 of any preferred shape, for instance endless loops and generally arcuate as detailed in Figure 3 and arranged in Figure 1 in inner and outer rows with the springs of the inner row smaller than those of the outer row in accordance with the arrangement in my said patent.

Said cushioning springs as shown in Figure 2 terminate short of the sides of the tire or body 10 and are overlapped and held in place by retaining flanges 20 integral with the rubber 11 and of the same thickness as the walls of springs 19. As said flanges 20 are of rubber they may be sprung outwardly as indicated by dotted lines at 20ª in Figure 2 to facilitate removal or replacement of a spring as suggested in the same figure by dotted lines 19ª.

In order to prevent the accumulation of mud and other foreign matter in the springs 19, they may have a suitable filler 21 disposed therein. This filler may be of a very soft rubber or other material which will not interfere with the resilience of said springs. The fillers 21 may be fastened in place in any approved manner, for instance by cementing or vulcanizing the same to the annular walls of the flanges 20. It is to be emphasized, however, that these fillers 21 may be omitted, if desired.

Embedded in the rubber 11 intermediate springs 19 and the tread surface 22 of the tire is a stiff, resilient metallic ring or band 23 designed to reinforce the cushioning springs 19 when in action and to even the pressure on said springs as said band may be appropriately enlarged or thickened as at 24. Said band 23 may be vulcanized in rubber 11 and to facilitate vulcanization, the band is preferably serrated or roughened partially, or entirely over its exposed surface as at 25 and then wrapped with textile fabric as at 26 before embedding it in the rubber.

Tread surface 22 may be curved as shown or of any other shape preferred.

All of the springs 19 and metal parts which contact with the rubber 11 may be suitably rounded or chamfered to prevent cutting of the rubber.

A tire or resilient body constructed as described will yield efficiently in use in substantially the same manner as a pneumatic tire, thus insuring easy riding qualities and overcoming the objections to a pneumatic tire.

In Figures 5, 6 and 7 a modification is shown. This form employs cushioning springs 30 of tubular cylindrical form in place of springs 19. They are also shown devoid of the fillers 21 which may, of course, be used if desired and which would here be cylindrical. The tread of the tire here designated 31 is flat in cross section while the band 23 is supplanted by a plurality of metallic bands or rings 32, round in cross section and adapted to function similarly to band 23. Otherwise this form is similar to that of Figures 1 to 4. Springs 30 may be omitted thus leaving merely a plurality of openings transversely of the tire.

In lieu of the fillers 21 the form disclosed in Figure 8 may be substituted. This form has a body 34 of soft rubber shaped to snugly fit springs 19 and if desired may be cemented or vulcanized to flanges 20. Disposed transversely of body 34 are multitudinous metallic tubular cushioning springs 35 maintained against displacement in any suitable manner as by flanges 36 similar to those at 20. Likewise, as shown in Figure 9, a cylindrical body 37 similar to that at 34 may be designed and fitted in the springs 30, the body 37 having springs 38 therein similar to springs 35.

Figures 10, 11 and 12 illustrate modified forms of band 23. In Figure 10 the band is designated 39 having a plurality of circumferential strips 40, the central one preferably being widest, joined by transverse bridges 41, thus leaving spaces 42 to form a reticulate structure. The bands 43 and 44 of Figures 11 and 12 are also reticulate, the former having openings 45 therethrough and the latter being notched at the longitudinal edges as at 46 and perforated between the notches, if desired.

Various other changes may be made within the spirit and scope of the invention.

I claim:—

1. A resilient tire having an elastic body, spring means therein, and a substantially endless resilient means encircling the tire between said spring means and the tread to even the pressure on said spring means when in action, said spring means and resilient means being in spaced relation whereby portions of the elastic body will be disposed between and in contact with them.

2. A resilient tire having an elastic body, a row of spaced apart spring members therein, a second row of spaced apart spring members therein inwardly of and spaced from the first row whereby portions of the elastic body will be disposed between and in contact with the spring members, the spring members of the second row crossing radial lines passing intermediate the adjacent spring members of the first row, a resilient metallic band encircling the tire having thickened portions integral with it and disposed along the said lines to even the pressure on said spring members when in action, the said band and adjacent spring members being in spaced relation whereby portions of the elastic body will be disposed between and in contact with them.

3. A resilient tire having recesses therein, spring means in said recesses, and resilient means on the body overlapping said spring means to prevent lateral displacement thereof and thereby secure the same in place, the resiliency of the second mentioned means enabling the same to be displaced for insertion or removal of the spring means.

4. A resilient tire having recesses therein, spring means in said recesses, and resilient means on the tire extending transversely of the recesses to prevent lateral displacement of the spring means and thereby secure the spring means in place, the resiliency of the second mentioned means enabling the same to be displaced for insertion or removal of the spring means.

5. A resilient tire having an elastic body, cushioning spring means therein, and means integral with the body coacting with the spring means to maintain the same in place, the second mentioned means being displaceable for insertion and removal of the spring means.

6. A resilient tire having an elastic body, cushioning spring members therein, and flanges integral with the body and overlapping the edges of the spring members to maintain them in place, the elasticity of the body enabling the flanges to be displaced for insertion and removal of the spring means.

7. A resilient tire consisting of an elastic body enclosing a plurality of substantially loop-like cushioning springs initially separate from the elastic body and connected to the elastic body outwardly of the edges of the cushioning springs therein, and resilient fillers enclosed by said springs initially separate from the elastic body and connected to the elastic body.

8. A resilient tire having an elastic body, cushioning spring means therein consisting of substantially endless elements, means integral with the body overlapping the spring means to prevent transverse displacement thereof and fillers disposed substantially completely within said spring means and united to the second means.

9. A resilient tire having an elastic body, cushioning spring means therein, means on and of the same material as the body coacting with the spring means to prevent transverse displacement thereof and fillers disposed substantially completely within said spring means and rubber-united to the second means.

10. A resilient tire having an elastic body provided with recesses, substantially endless cushioning spring members therein, flanges of the same material as the body extending therefrom and overlapping opposite edges of the spring means to prevent transverse displacement thereof, fillers in said spring means initially separate from the elastic body and being rubber-united to the flanges.

In testimony whereof I have affixed my signature.

ARTHUR E. BAUMAN.